United States Patent [19]
Akuta et al.

[11] Patent Number: 5,370,199
[45] Date of Patent: Dec. 6, 1994

[54] VEHICLE TRACTION CONTROL SYSTEM

[75] Inventors: Yoshimitsu Akuta; Tooru Ikeda; Takashi Nishihara, all of Saitama, Japan

[73] Assignee: Honda Giken Kogyo Kabushiki Kaisha, Tokyo, Japan

[21] Appl. No.: 44,066

[22] Filed: Apr. 6, 1993

[30] Foreign Application Priority Data

Apr. 10, 1992 [JP] Japan .................................. 4-118412

[51] Int. Cl.$^5$ .............................................. B60K 28/16
[52] U.S. Cl. .................................. 180/197; 364/426.02
[58] Field of Search .................... 180/197; 364/426.02, 364/426.03, 426.04

[56] References Cited

U.S. PATENT DOCUMENTS

4,965,729 10/1990 Haefner ........................... 180/197 X
4,976,330 12/1990 Matsumoto .......................... 180/197

Primary Examiner—Karin L. Tyson
Assistant Examiner—F. Zeender
Attorney, Agent, or Firm—Armstrong, Westerman, Hattori, McLeland & Naughton

[57] ABSTRACT

In a traction control system for a vehicle which controls the traction of the driven wheels according to the slip ratio of the driven wheels obtained as a relationship between the vehicle speed and the speed of the driven wheels, the vehicle speed is obtained from the speed of the non-driven wheels. Normally, the average value of the speeds of the non-driven wheels is used as the basis for computing the vehicle speed, but when one of the non-driven wheels is likely to be lifted from the road surface due to the turning maneuver of the vehicle, the speed of one of the non-driven wheels which is higher than that of the other non-driven wheel and is therefore likely to be in contact with the road surface is used for fining the vehicle speed. Thus, the vehicle speed is simply obtained from the speed of the non-driven wheels, but the traction control can be reliably carried out according to a correctly obtained vehicle speed.

8 Claims, 8 Drawing Sheets

VEHICLE TRACTION CONTROL SYSTEM

TECHNICAL FIELD

The present invention relates to a traction control system for controlling the traction of the driven wheels of a vehicle, or the drive force applied to the driven wheels, and in particular to such a traction control system which can effectively control the slipping of the driven wheels by accurately detecting the slipping condition of the driven wheels.

BACKGROUND OF THE INVENTION

Generally, the driven wheels of a vehicle start slipping when the drive force applied to the driven wheels exceeds the upper limit of the frictional force between the tires and the road surface when the vehicle is starting off or accelerating, and the slip ratio giving a measure of such slipping can be given by $$\lambda = (V_W - V)/V_W$$

where $V_W$ is the circumferential speed of the driven wheels, and V is the speed of the vehicle relative to the road surface.

Figure 9:
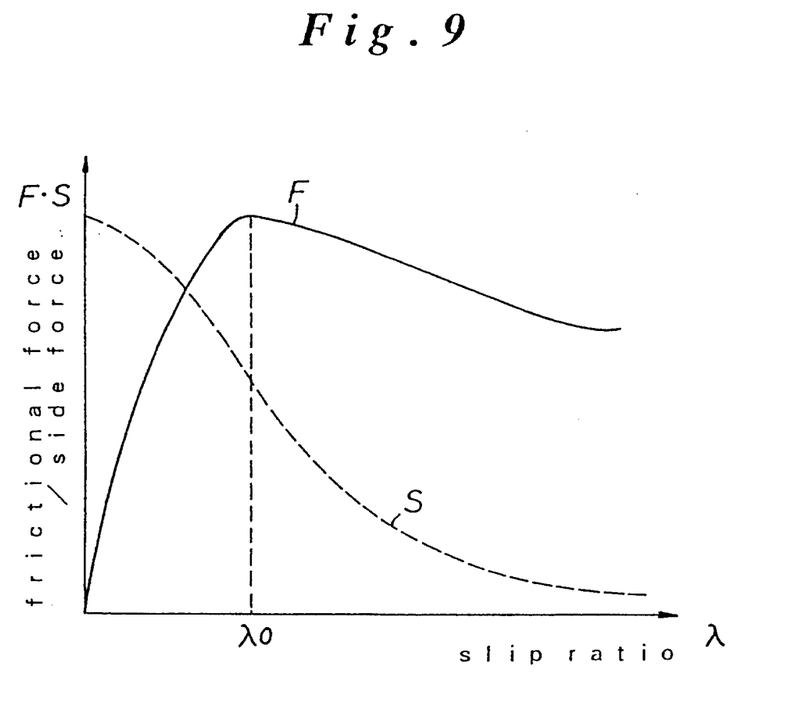
FIG. 9 is a property line diagram showing the relationship between the frictional forces and the slip ratio.

The frictional force F between the tires and the road surface (the upper limit of the drive force that can be applied to the driven wheels) changes according to the slip ratio $\lambda$ as given in FIG. 9, and takes a maximum value when the slip ratio is equal to a certain value $\lambda_O$. The frictional force F between the road surface and the tires is measured in the direction of the motion (the longitudinal direction) of the vehicle, but the lateral frictional force S (the side force) diminishes as the slip ratio $\lambda$ increases as indicated by the dotted curve in FIG. 9.

In view of this fact, it is necessary to detect the slip ratio $\lambda$ and control it as close to the prescribed value $\lambda_O$ as possible to maximize the longitudinal frictional force F between the tires and the road surface, and prevents the excessive reduction in the lateral frictional force S between the tires and the road surface and thus the occurrence of the side slipping of the vehicle.

Figure 7:
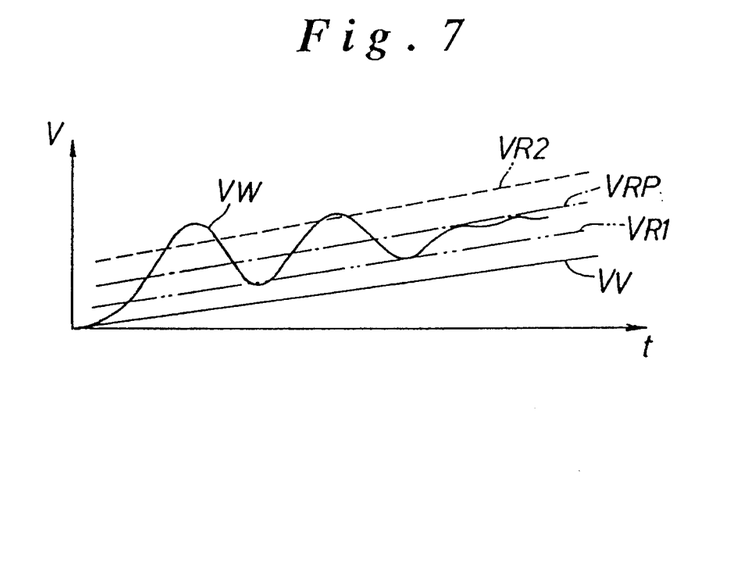
FIG. 7 is a time chart showing the principle of a slip control.

Based on this recognition, a traction control system (TCS) has already been put into practical use wherein the speed of the non-driven wheels $V_V$ is assumed to be equal to the vehicle speed V, and the engine output is automatically curbed when the speed of the driven wheels $V_W$ becomes higher than the speed of the non-driven wheels $V_V$, and the driven wheels are therefore considered to be slipping excessively. More specifically, as illustrated in FIG. 7, based on the speed of the non-driven wheels $V_V$ when the vehicle is accelerating, a first reference speed $V_{R1}$ for determining the lower limit of the traction control, a second reference speed $V_{R2}$ for determining the upper limit of the traction control, and a target speed $V_{RP}$ are derived by the following equations.

$$V_{R1} = K_1 \cdot V_V + C_1$$

$$V_{R2} = K_2 \cdot V_V + C_2$$

$$V_{RP} = K_P V_V + C_P$$

where $K_1$, $K_2$, $K_P$, $C_1$, $C_2$, and $C_P$ are constants, and $K_1 < K_P < K_2$, $C_1 < C_P < C_2$.

When the speed of the driven wheels $V_W$ has exceeded the second reference speed $V_{R2}$, the engine output is controlled by limiting the supply of fuel to the engine or by delaying the ignition timing in the manner of a feedback control so that the speed of the driven wheels $V_W$ may be converged to the target speed $V_{RP}$.

In such a conventional control process, the speed of the non-driven wheels $V_V$ (the vehicle speed V) for computing the reference values $V_{R1}$, $V_{R2}$ and $V_{RP}$ was obtained as an average value $(V_{RL} + V_{RR})/2$ of the speeds of the right and left non-driven wheels $V_{RL}$ and $V_{RR}$. The average value is used for the purpose of eliminating the influences of the difference between the speeds of the right and left wheels when the vehicle is making a turn (refer to Japanese patent laid-open publication No. 61-60331).

However, for instance, when a front-drive vehicle makes a turn at high speed (which may be considered as over-speeding for the given radius of curvature of the curve), the inner wheel (the inner one of the non-driven wheels) may be lifted from the road surface, and since a non-driven wheel lifted from the road surface receiving no rotating force from the road surface naturally has a substantially lower speed than the outer wheel, the average value of the speeds of the right and left non-driven wheels will give a substantially lower speed than the actual vehicle speed.

Figure 8:
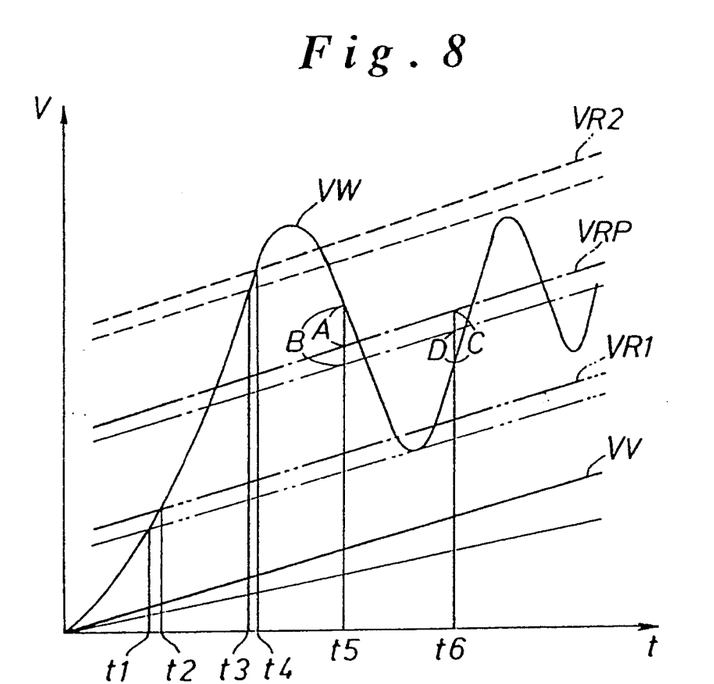
FIG. 8 is a time chart showing the problem arising from the lifting of one of the non-driven wheels.

Since the reference values $V_{R1}$, $V_{R2}$ and $V_{RP}$ should be given as mathematical functions of the vehicle speed, if a vehicle speed lower than the actual vehicle speed is used for determining these reference values as illustrated in FIG. 8 (in which the reference value with the right and left wheels kept in contact with the road surface is indicated by the bold lines while the reference value with one of the wheels lifted from the road surface is indicated by the thin lines), the traction control may be started at time point t1 even though the actual point t2 for starting the traction control has not been reached, the engine output control may be started at time point t3 although the originally intended upper limit t4 has not been reached, the required degree of curbing the engine output may be by control amount B whereas it should be by control amount A as indicated at point t5, and the increase in the engine output may be only by control amount D and insufficient because the engine output should be actually increased by control amount C as indicated at point t6.

BRIEF SUMMARY OF THE INVENTION

In view of such problems of the prior art, a primary object of the present invention is to provide a vehicle traction control system which can favorably control the traction of the driven wheels of the vehicle by preventing them from excessively slipping by accurately detecting such a slipping condition of the driven wheels.

A second object of the present invention is to provide a vehicle traction control system which can prevent excessive slipping of the driven wheels simply by measuring the rotational speeds of the non-driven wheels with a necessary accuracy.

A third object of the present invention is to provide a vehicle traction control system which can prevent excessive slipping of the driven wheels simply by measuring the rotational speeds of the wheels even when one of the non-driven wheels is lifted from the road surface and does not accurately reflect the road speed of the vehicle.

According to the present invention, these and other objects can be accomplished by providing a traction control system for a vehicle having a pair of driven wheels, and a pair of non-driven wheels, comprising: driven wheel speed detecting means for detecting speeds of said driven wheels; non-driven wheel speed detecting means for detecting speeds of said non-driven wheels; vehicle speed determining means for determining a vehicle speed from speeds detected by said non-driven wheel speed detecting means; slip detecting means for detecting a measure of the slipping of said driven wheels by comparing speeds detected by said driven wheel speed detecting means with said vehicle speed determined by said vehicle speed determining means; and wheel lift detecting means for detecting a substantial lifting of one of said non-driven wheels from a road surface; when said wheel lift detecting means has detected a substantial lifting of one of said non-driven wheels from the road surface, said vehicle speed determining means determining said vehicle speed solely from the speed of the other of said non-driven wheels.

According to such a structure, when there is a possibility that one of the non-driven wheels may be substantially lifted from the road surface, or the vertical load acting on this non-driven wheel is sufficiently small, the vehicle speed is obtained from the higher one of the speeds of the right and left non-driven wheels (or the outer non-driven wheels with respect to the curve along which the vehicle is travelling), or the speed of the non-driven wheel which is certainly in contact with the road surface, instead of using both the speeds of the right and left non-driven wheels, typically the average value of the speeds of the right and left non-driven wheels. As a result, the traction control can be executed according to a computed vehicle speed which more reliably reflects the actual vehicle speed. This is particularly advantageous because it is extremely difficult to directly measure the vehicle speed, but the present invention allows the rotational speeds of the non-driven wheels to be suitable data for computing the vehicle speed without impairing the performance of the traction control system which makes use of the thus obtained vehicle speed.

The lifting of one of the non-driven wheels can be detected in a number of ways, for instance, by directly measuring the vertical force acting on the wheel, by measuring the lateral acceleration in combination with the vehicle speed, by measuring the yaw rate of the vehicle in combination with the vehicle speed, or by measuring a steering angle of the vehicle in combination with the vehicle speed.

Alternatively, the lifting of one of the non-driven wheels can be detected by computing a difference between the speeds of the non-driven wheels, and detecting the difference exceeding a certain threshold value.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
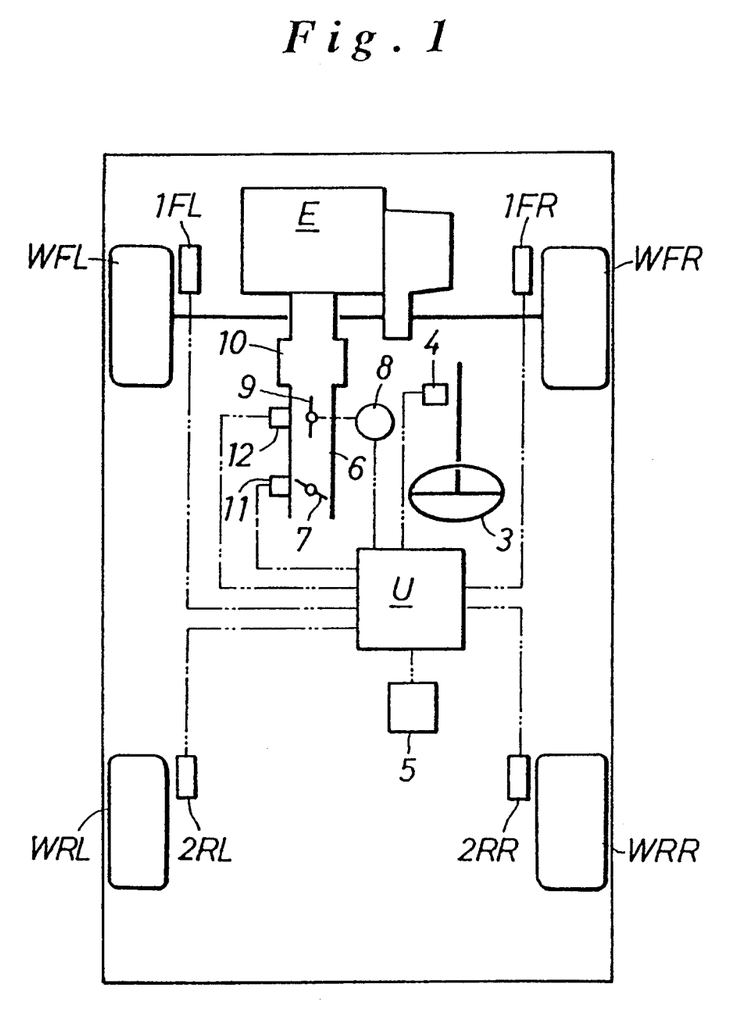
FIG. 1 is a schematic diagram of a vehicle to which the present invention is applied.

FIG. 1 shows an example of a vehicle to which the present invention may be applied. This vehicle is a front-drive vehicle, and comprises a pair of, or right and left driven (front) wheels $W_{FL}$ and $W_{FR}$, and a pair of, or right and left non-driven (rear) wheels $W_{RL}$ and $W_{RR}$. The driven wheels $W_{FL}$ and $W_{FR}$ are provided with driven wheel speed detectors $1_{FL}$ and $1_{FR}$, respectively, and the non-driven wheels $W_{RL}$ and $W_{RR}$ are likewise provided with non-driven wheel speed detectors $2_{RL}$ and $2_{RR}$, respectively. A steering wheel 3 is provided with a steering angle detector 4 which detects a steering angle $6\gamma$, and an acceleration detector 5 is mounted on an appropriate part of the vehicle body for detecting a lateral acceleration G when the vehicle makes a turn. An intake passage 6 of an engine E is provided with a first throttle valve 7 which is opened and closed in synchronism with the movement of an accelerator pedal (not shown in the drawing), a second throttle valve 9 which is opened and closed by a pulse motor 8, a surge tank 10 for removing the pulsation of the engine intake, a first throttle valve angle detector 11 for detecting an opening angle of the first throttle valve 7, and a second throttle opening angle detector 12 for detecting an opening angle of the second throttle valve 9.

The output signals from the above mentioned driven wheel speed detectors $1_{FL}$ and $1_{FR}$, the non-driven wheel speed detectors $2_{RL}$ and $2_{RR}$, the steering angle detector 4, the acceleration detector 5, the pulse motor 8, the first throttle valve opening angle detector 11, and the second throttle valve opening angle detector 12 are supplied to an electronic control unit U.

Figure 2:
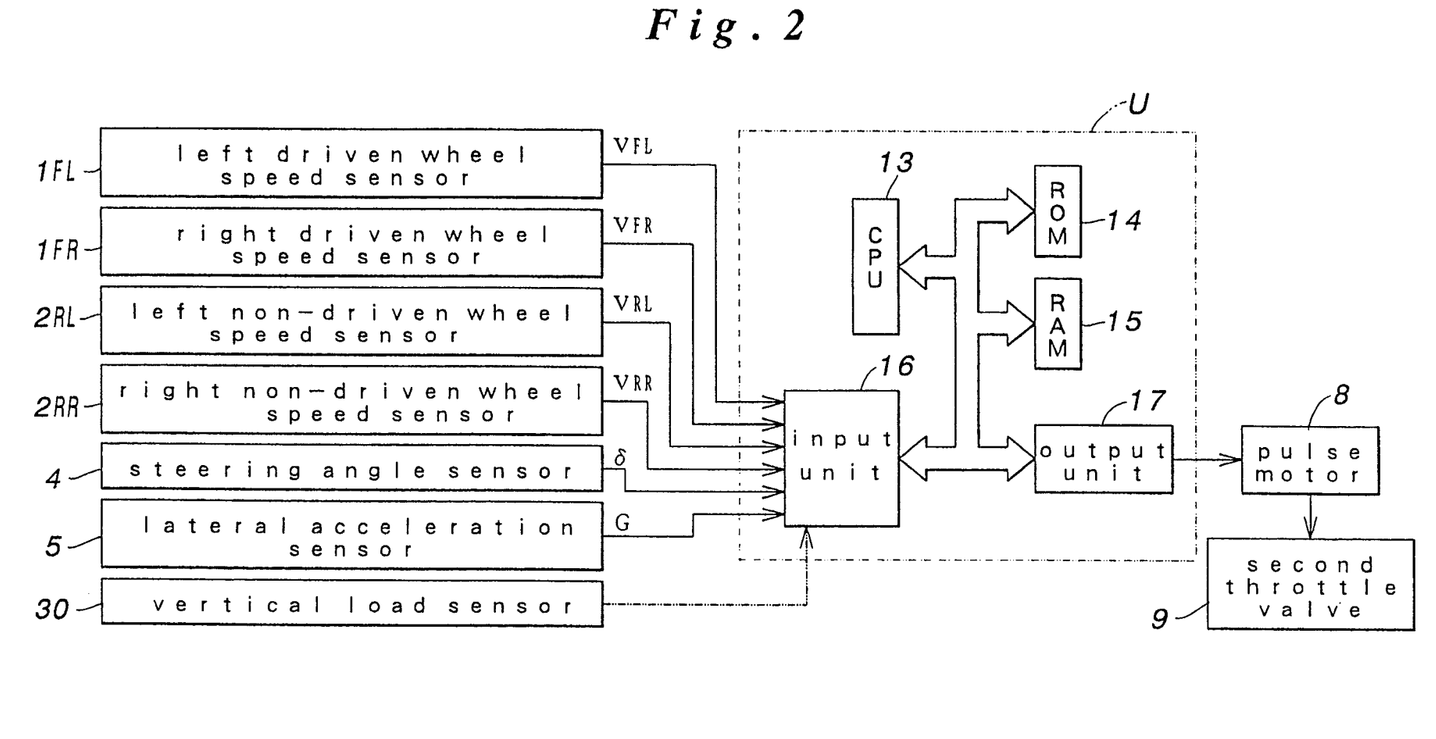
FIG. 2 is a block diagram of the traction control system according to the present invention.

Referring to FIG. 2, the electronic control unit U conducts an arithmetic process on the signals from the various detectors, and controls the output torque of the engine E by actuating the second throttle valve 9 with the pulse motor 8. The electronic control unit U comprises a central processing unit (CPU) 13 for carrying out the arithmetic process, read-only-memory (ROM) 14 for storing data on control programs and various tables, random-access-memory (RAM) 15 for temporarily storing the output signals from the various detectors, an input unit 16 connected to the outputs of the detectors, and an output unit 17 for producing a control signal for the pulse motor 8.

As an important point of the present invention, the vehicle speed is computed by the CPU 13 according to the data supplied to the input unit 16. As alternate embodiments of the present invention, it is possible to use data from the steering angle sensor 4, and detect a substantial lifting of one of the non-driven wheels by detecting a steering angle exceeding a certain threshold value which is given as a mathematical function of the vehicle speed. Alternatively, it is also possible to use data from a vertical load sensor 30, and detect a substantial lifting of one of the non-driven wheels by detecting a vertical load acting on each of the non-driven wheels exceeding a certain threshold value.

Figure 3:
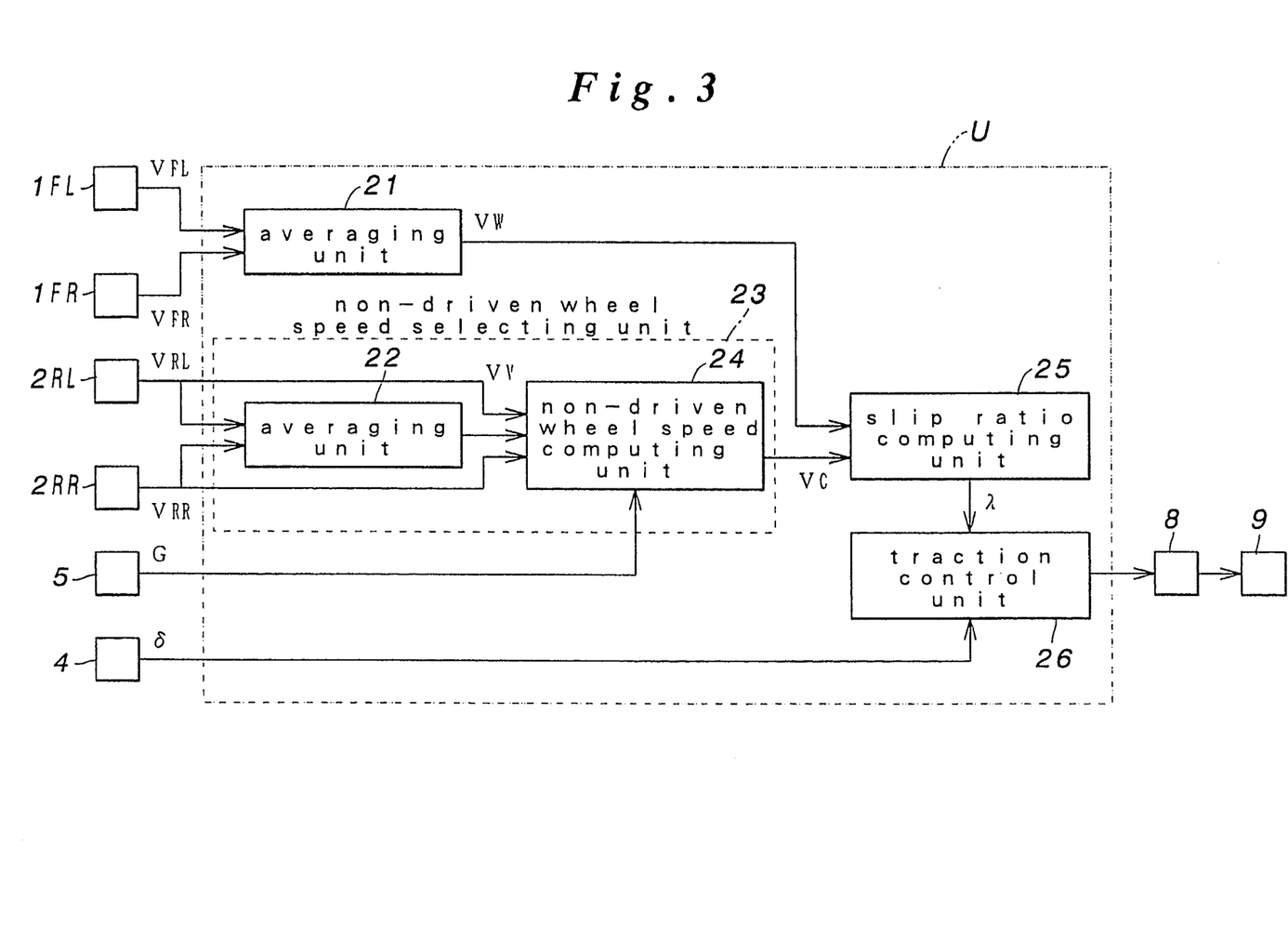
FIG. 3 is a block diagram of the circuit structure of an electronic control unit according to the present invention.

Referring to FIG. 3, the circuit structure of the electronic control unit is described in the following. The speeds $V_{FL}$ and $V_{FR}$ of the driven wheels detected by the driven wheel speed detectors $1_{FL}$ and $1_{FR}$ are supplied to a driven wheel average speed computing unit 21 which computes the average value $V_W=(V_{FL}+V_{FR})/2$ of the speeds of the right and left driven wheels $V_{FL}$ and $V_{FR}$.

The speeds $V_{RL}$ and $V_{RR}$ of the non-driven wheels detected by the non-driven wheel speed detectors $2_{RL}$ and $2_{RR}$ are supplied to a non-driven wheel average speed computing unit 22 which computes the average value $V_V=(V_{RL}+V_{RR})/2$ of the speeds of the right and left non-driven wheels $V_{RL}$ and $V_{RR}$.

The average value $V_V$ of the non-driven wheels, the individual speeds of the non-driven wheels $V_{RL}$ and $V_{RR}$, and the lateral acceleration G from the acceleration sensor 5 when the vehicle is making a turn are supplied to a non-driven wheel speed computing unit 24 which forms a non-driven wheel speed selecting unit 23 along with the non-driven wheel average speed computing unit 22, and a speed of the non-driven wheels $V_C$ which is optimum for the given operating condition of the vehicle can be obtained.

The average speed of the driven wheels $V_W$ computed by the driven wheel average speed computing unit 21, and the average speed of the non-driven wheels $V_C$ computed by the non-driven wheel speed computing unit 24 are supplied to a slip ratio computing unit 25 which computes a slip ratio $\lambda$.

The slip ratio $\lambda$ and the steering angle $\delta$ are supplied to a traction computing unit 26, and after an appropriate process of computation a drive signal is finally supplied to the pulse motor 8 from the output unit 17. As a result, the opening angle of the second throttle valve 9 is controlled, and the output torque of the engine E is appropriately changed so that the traction for the driven wheel $W_{FL}$ and $W_{FR}$ is optimally controlled without causing any excessive slipping of the wheels.

Figure 4:
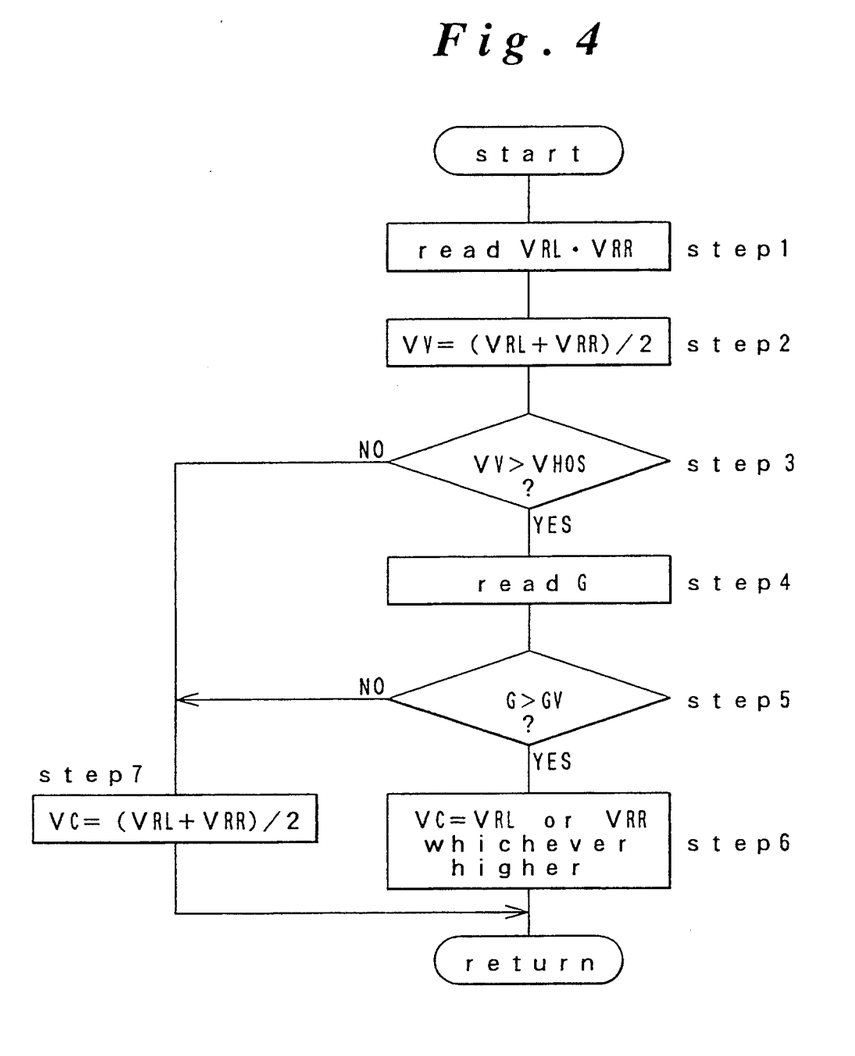
FIG. 4 is a flow chart showing a process of computing the vehicle speed.

FIG. 4 is a flow chart showing the control process of the present invention. First of all, the speeds of the right and left non-driven wheels $V_{RL}$ and $V_{RR}$ are detected (step 1), and the average of these values are computed as a provisional vehicle speed $V_V$ (step 2). This value is compared with a prescribed value $V_{HOS}$ (step 3). If $V_V>V_{HOS}$, a lateral acceleration G is obtained from the acceleration sensor 5 (step 4), and it is compared with a prescribed value $G_V$. If $G>G_V$, the higher one of the speeds of the right and left non-driven wheels $V_{RL}$ and $V_{RR}$ is set as the representative speed of the non-driven wheels $V_C$ (step 6), and this value is supplied to the slip ratio computing unit 25 as a basis for the traction control described above.

On the other hand, if $V_V<V_{HOS}$ in step 3, or if $G<G_V$ in step 5, the average value of the right and left non-driven wheels is set as the representative value $V_C$ (step 7) of the vehicle speed for the traction control.

Figure 5:
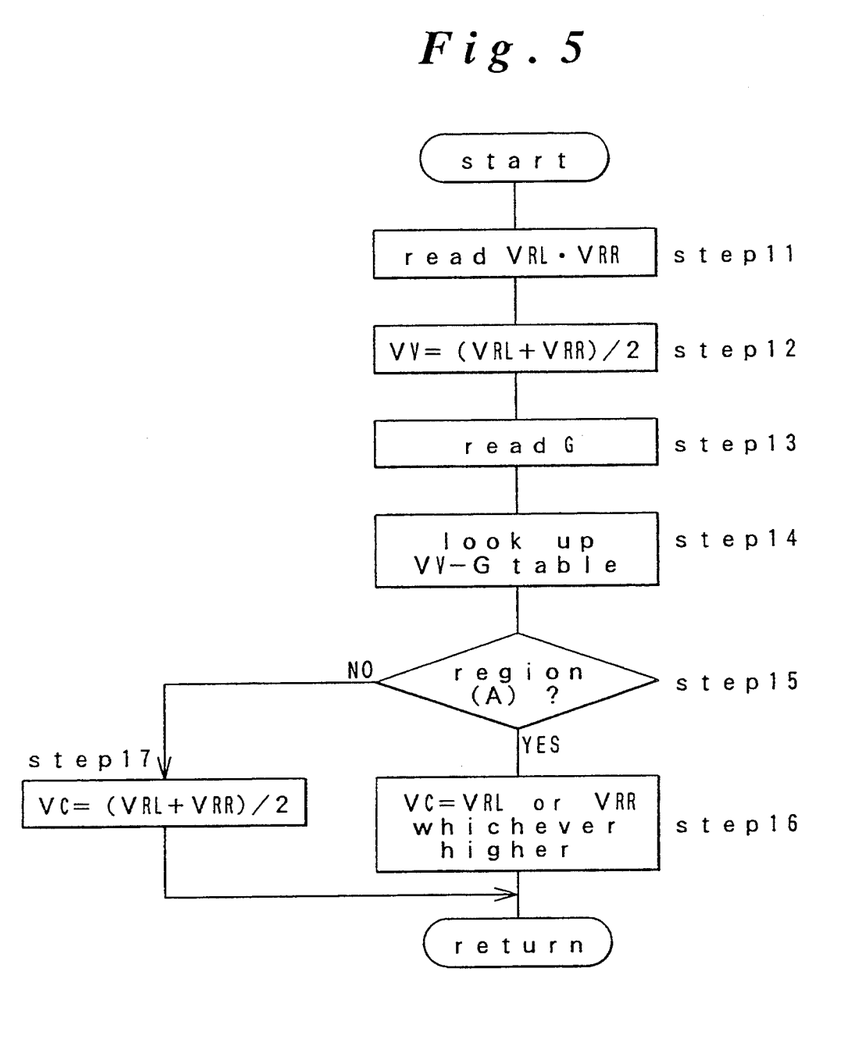
FIG. 5 is a flow chart showing another process of computing the vehicle speed.

FIG. 5 shows another embodiment of the control process of the present invention. First of all, the speeds $V_{RL}$ and $V_{RR}$ of the right and left non-driven wheels are individually detected (step 11), and after computing an average value of these speeds, it is provisionally set as the vehicle speed $V_C$ (step 12). Then, the lateral acceleration G is obtained by the acceleration detector 5 (step 13), and according to the thus obtained lateral acceleration G and the provisional vehicle speed $V_V$ a pre-defined $V_V$-G table (FIG. 6) is looked up (step 14). If a combination of the lateral acceleration G and the provisional vehicle speed $V_V$ is located in a region A of FIG. 6, the higher one of the speeds $V_{RL}$ and $V_{RR}$ of the right and left non-driven wheels is set as the representative speed $V_C$ of the non-driven wheels (step 16), and this value is supplied to the slip ratio computing unit 25 as the basis for the traction control process described above.

Figure 6:
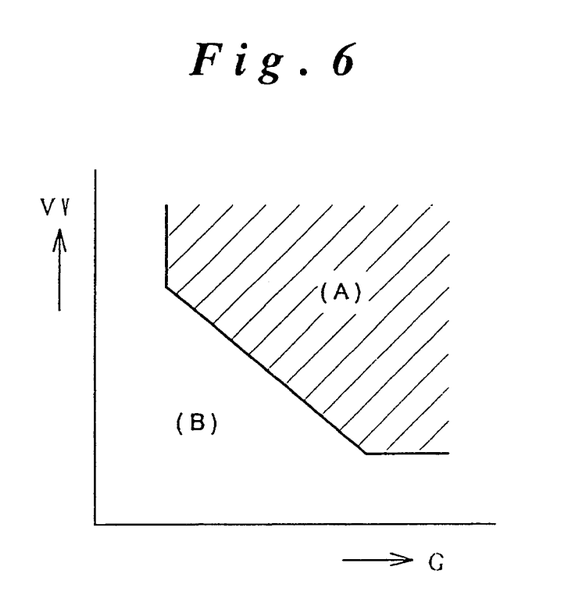
FIG. 6 is a conceptual diagram of the $V_V$-G table used in the second process.

On the other hand, if the combination of the lateral acceleration G and the provisional vehicle speed $V_V$ is not located in a region A of FIG. 6, or, in other words, located in a region B, the average value of the right and left non-driven wheels is set as the representative speed $V_C$ of the non-driven wheels (step 17) serving as the basis for the traction control process.

In the present embodiment, the various combinations of G and $V_V$ are placed in the table illustrated in FIG. 6, but this table may be substituted with an appropriate mathematical function.

Thus, as described above, when the average value of the right and left non-driven wheels is higher than a prescribed value, and the lateral acceleration acting on the vehicle body is greater than a prescribed value, since it is then likely that the inner non-driven wheel may be lifted from the road surface, the vehicle speed is obtained from the higher one of the speeds of the right and left non-driven wheels or the speed of the non-driven wheel which is certainly in contact with the road surface, instead of using the average value of the speeds of the right and left non-driven wheels. As a result, the traction control can be executed according to a computed vehicle speed which more reliably reflects the actual vehicle speed.

In the above described embodiments, it was assumed that the speeds of the right and left driven wheels are equal to each other or the difference therebetween is negligibly small, but it is also possible to detect the difference between the speeds of the right and left driven wheels and to select the higher one of the speeds if the speed difference is greater than a prescribed value. Similarly, it is also possible to detect the difference between the speeds of the right and left non-driven wheels and to select the higher one of the speeds if the speed difference is greater than a prescribed value, for the purpose of determining the vehicle speed.

The present invention is not limited by the above described embodiments. For instance, in the above described embodiments, the first and second throttle valves were provided, and the opening angle of the second throttle valve was controlled without regard to the opening angle of the first throttle valve, but it is also possible to motor-drive the first throttle valve.

Thus, according to the present invention, in a vehicle traction control system, having speed detecting means for detecting the speeds of the right and left driven wheels and the right and left non-driven wheels and slip detecting means for detecting excessive slipping of the right and left driven wheels according to the speeds of the right and left non-driven wheels, for controlling the traction for the driven wheels when the driven wheels are determined to be in the state of excessive slipping, since an average value of the speeds of the right and left non-driven wheels is obtained, and if this average value is equal to or higher than a prescribed value, and the lateral acceleration is equal to or higher than a prescribed value, the higher one of the speeds of the right and left non-driven wheels is used as the representative speed of the right and left non-driven wheels, it is possible to use a vehicle speed value which takes into account the possible occurrence of the lifting of the inner wheel when the vehicle is making a turn by adding the lateral acceleration as a control parameter, and to reduce the apparent slip ratio of the vehicle even when the inner wheel is lifted from the road surface when the vehicle is making a turn. Therefore, the speed of the non-driven wheels can be relatively accurately obtained, and a favorable, originally intended traction control can be accomplished.

Although the present invention has been described in terms of specific embodiments thereof, it is possible to modify and alter details thereof without departing from the spirit of the present invention.

We claim:

1. A traction control system for a vehicle having a pair of driven wheels, and a pair of non-driven wheels, comprising:
   driven wheel speed detecting means for detecting speeds of said driven wheels;
   non-driven wheel speed detecting means for detecting speeds of said non-driven wheels;
   vehicle speed determining means for determining a vehicle speed from speeds detected by said non-driven wheel speed detecting means;
   slip detecting means for detecting a measure of the slipping of said driven wheels by comparing speeds detected by said driven wheel speed detecting means with said vehicle speed determined by said vehicle speed determining means;
   traction control means for controlling traction of said vehicle wheels according to said measure of the slipping of said driven wheels detected by said slip detecting means; and
   wheel lift detecting means for detecting a substantial lifting of one of said non-driven wheels from a road surface,
   wherein when said wheel lift detecting means has detected a substantial lifting of one of said non-driven wheels from the road surface, said vehicle speed determining means determines said vehicle speed solely from the speed of the other of said non-driven wheels.

2. A vehicle traction control system according to claim 1, wherein said vehicle speed determining means determines said vehicle speed from an average value of the speeds of said non-driven wheels when said wheel lift detecting means has not detected a substantial lifting of either one of said non-driven wheels from the road surface, and from the speed of one of said non-driven wheels when said wheel lift detecting means has detected a substantial lifting of the other of said non-driven wheels from the road surface.

3. A vehicle traction control system according to claim 1, wherein said wheel lift detecting means comprises a lateral acceleration sensor, and detects a substantial lifting of one of said non-driven wheels by detecting a lateral acceleration exceeding a certain threshold value.

4. A vehicle traction control system according to claim 3, wherein said threshold value is dependent on a value indicative of a vehicle speed.

5. A vehicle traction control system according to claim 1, wherein said wheel lift detecting means comprises means for computing a difference between the speeds of said non-driven wheels, and detects a substantial lifting of one of said non-driven wheels by detecting said difference exceeding a certain threshold value.

6. A vehicle traction control system according to claim 1, wherein said wheel lift detecting means comprises means for computing a difference between the speeds of said driven wheels, and detects a substantial lifting of one of said driven wheels by detecting said difference exceeding a certain threshold value.

7. A vehicle traction control system according to claim 1, wherein said wheel lift detecting means comprises a steering angle sensor, and detects a substantial lifting of one of said non-driven wheels by detecting a steering angle exceeding a certain threshold value which is given as a mathematical function of said vehicle speed.

8. A vehicle traction control system according to claim 1, wherein said wheel lift detecting means comprises a vertical load sensor for detecting a vertical load acting on each of said non-driven wheels, and detects a substantial lifting of one of said non-driven wheels by detecting a vertical load exceeding a certain threshold value.

* * * * *